(12) United States Patent
Chang

(10) Patent No.: US 7,388,500 B2
(45) Date of Patent: Jun. 17, 2008

(54) ENHANCED MECHANISM FOR RADIO FREQUENCY IDENTIFICATION READER

(75) Inventor: The-Nan Chang, Taipei (TW)

(73) Assignees: Tatung Company, Taipei (TW); Tatung University, Taipei (TW)

( * ) Notice: Subject to any disclaimer, the term of this patent is extended or adjusted under 35 U.S.C. 154(b) by 232 days.

(21) Appl. No.: 11/213,721

(22) Filed: Aug. 30, 2005

(65) Prior Publication Data
US 2006/0158334 A1 Jul. 20, 2006

(30) Foreign Application Priority Data
Dec. 31, 2004 (TW) .............................. 93141772 A

(51) Int. Cl.
*G08B 13/14* (2006.01)

(52) U.S. Cl. ................ 340/572.7; 340/572.1; 340/572.4; 340/572.5; 340/539.21; 340/539.23; 343/6.8; 343/787; 343/788

(58) Field of Classification Search ............ 340/572.7, 340/572.8, 572.1, 572.4, 572.5, 539.21, 539.23, 340/825.36, 825.49, 825.69; 343/6.8, 787, 343/788, 841

See application file for complete search history.

(56) References Cited

U.S. PATENT DOCUMENTS

| | | | | |
|---|---|---|---|---|
| 4,700,179 A | * | 10/1987 | Fancher | 340/572.2 |
| 6,724,308 B2 | * | 4/2004 | Nicholson | 340/572.1 |
| 6,933,849 B2 | * | 8/2005 | Sawyer | 340/572.4 |
| 7,081,818 B2 | * | 7/2006 | Eckstein et al. | 340/572.1 |
| 7,091,858 B2 | * | 8/2006 | Copeland et al. | 340/572.1 |
| 7,183,921 B2 | * | 2/2007 | Bonnell et al. | 340/572.1 |

* cited by examiner

*Primary Examiner*—Hung Nguyen
(74) *Attorney, Agent, or Firm*—Bacon & Thomas, PLLC

(57) ABSTRACT

The invention relates to an enhanced mechanism for RFID reader which includes: an antenna for receiving a RFID signal transmitted from an object under test and outputting the RFID signal to the RFID reader; a metal plate disposed on an entrance of a building. The metal plate and the object under test are respectively placed on opposite sides of the antenna. The angle between the first metal plate and the second metal plate is from 30 to 180 degrees; therefore the metal plate, the antenna, and the RFID reader provide an enhanced mechanism of a RFID reader.

5 Claims, 5 Drawing Sheets

ENHANCED MECHANISM FOR RADIO FREQUENCY IDENTIFICATION READER

BACKGROUND OF INVENTION

1. Field of the Invention

The present invention relates to Radio Frequency Identification (RFID) reader and, more particularly, to an enhanced mechanism for RFID reader.

2. Description of Related Art

RFID is suitable for use of tag and reader, which applies the technique of wireless radio waves to identify objects automatically. The frequency band of RFID includes low frequency (125 k-135 kHz), high frequency (13.56 MHz), ultra high frequency (UHF 860-930 MHz), microwave (2.45 GHz), etc. Characteristics of different frequencies have different applications. For the RFID of electromagnetic induction type, the antenna of the reader continuously emits electromagnetic pulses, and the antenna coil of the RFID tag uses magnetic field to produce electric currents. The drive chip induces a coupling effect to start a certification process, which transfers the stored information to the reader within an operative distance. Then, the reader will transform and transfer the received information to an edge server to be encoded and processed. Therefore, RFID technique can be applied in a tracing device for merchandise management. For example, if the merchandises pass through the effective area of a special scanning device, the RFID reader will be able to locate its exact position.

As shown in FIG. 1, when merchandises pass through the entrance of a building, antenna 15 can receive the RFID signal reflected by the RFID tag 14 on the subject, and then it outputs the received RFID signal to a RFID reader 16. However, the RFID signal reflected by the RFID tag 14 on the object is passive, so the signal is weak. If the transmission distance is too long, or the RFID tag is attached to a dead space, both cases will result in the situation of ineffective RFID signal identification. Therefore, it is desired to provide an effective RFID signal receiver to mitigate and/or obviate the aforementioned problems.

SUMMARY OF THE INVENTION

The present invention has been accomplished under the circumstances in view. The present invention relates to an enhanced mechanism for RFID reader, which includes an antenna and a metal plate device. The antenna can receive RFID signal transmitted from an object under test and output the RFID signal to the RFID reader. The metal plate device is disposed on an entrance of a building. The metal plate and the object under test are respectively placed on the opposite sides of the antenna. Such a metal plate device is formed by two metal plates, forming an angle between 30 and 180 degrees. The operating frequency of RFID signal can be set between ultra high frequency and microwave frequency. The combination of the antenna and metal plates forms a better antenna transmitting system. Being linked with RFID tag, RFID signal reader can improve its receiving capability and avoid missing weaker signal, and thus an effective RFID signal receiver can be improved.

DETAILED DESCRIPTION OF THE PREFERRED EMBODIMENT

Figure 1:
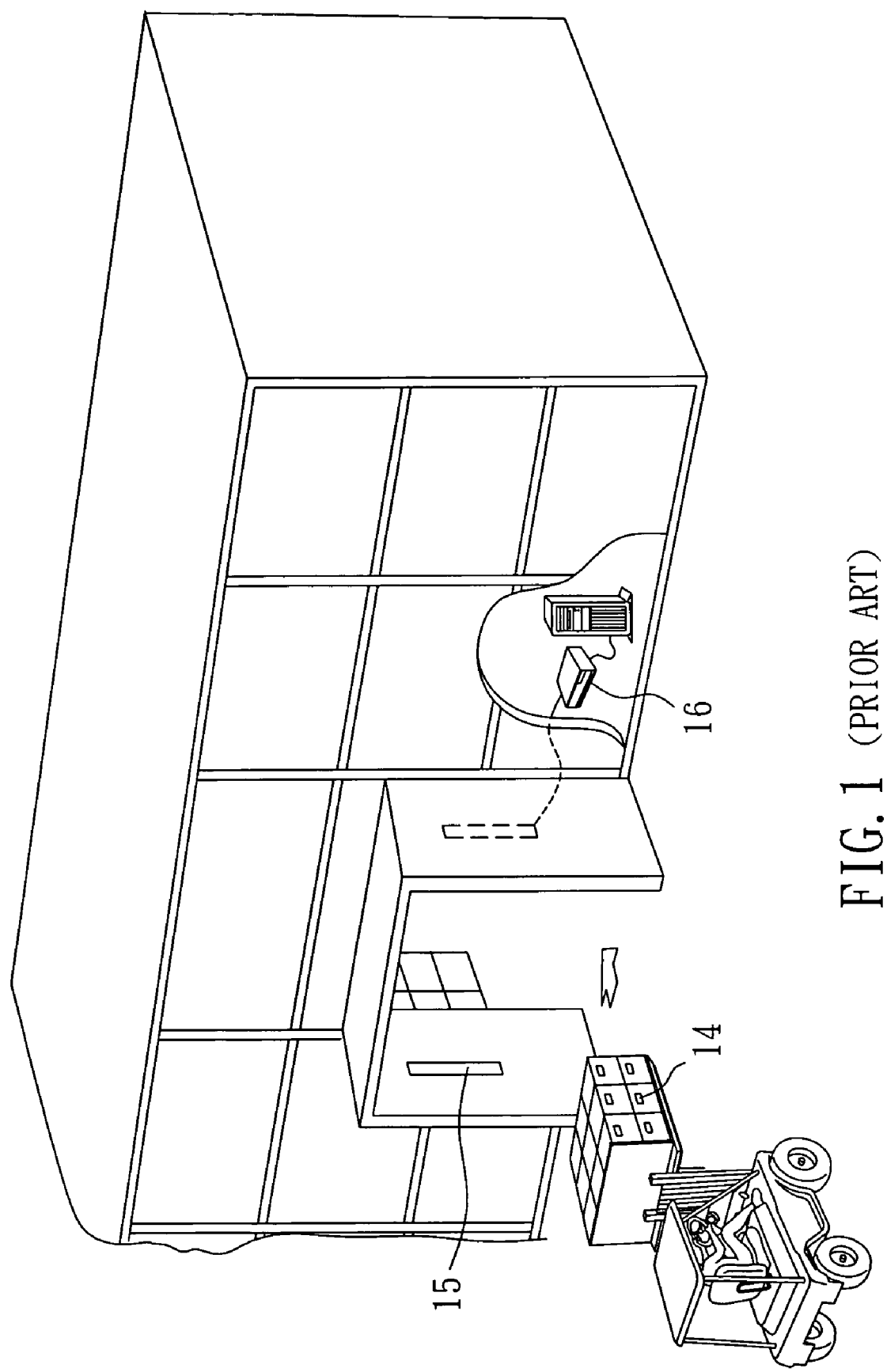
FIG. 1 is a schematic view of a RFID reader.
Figure 2:
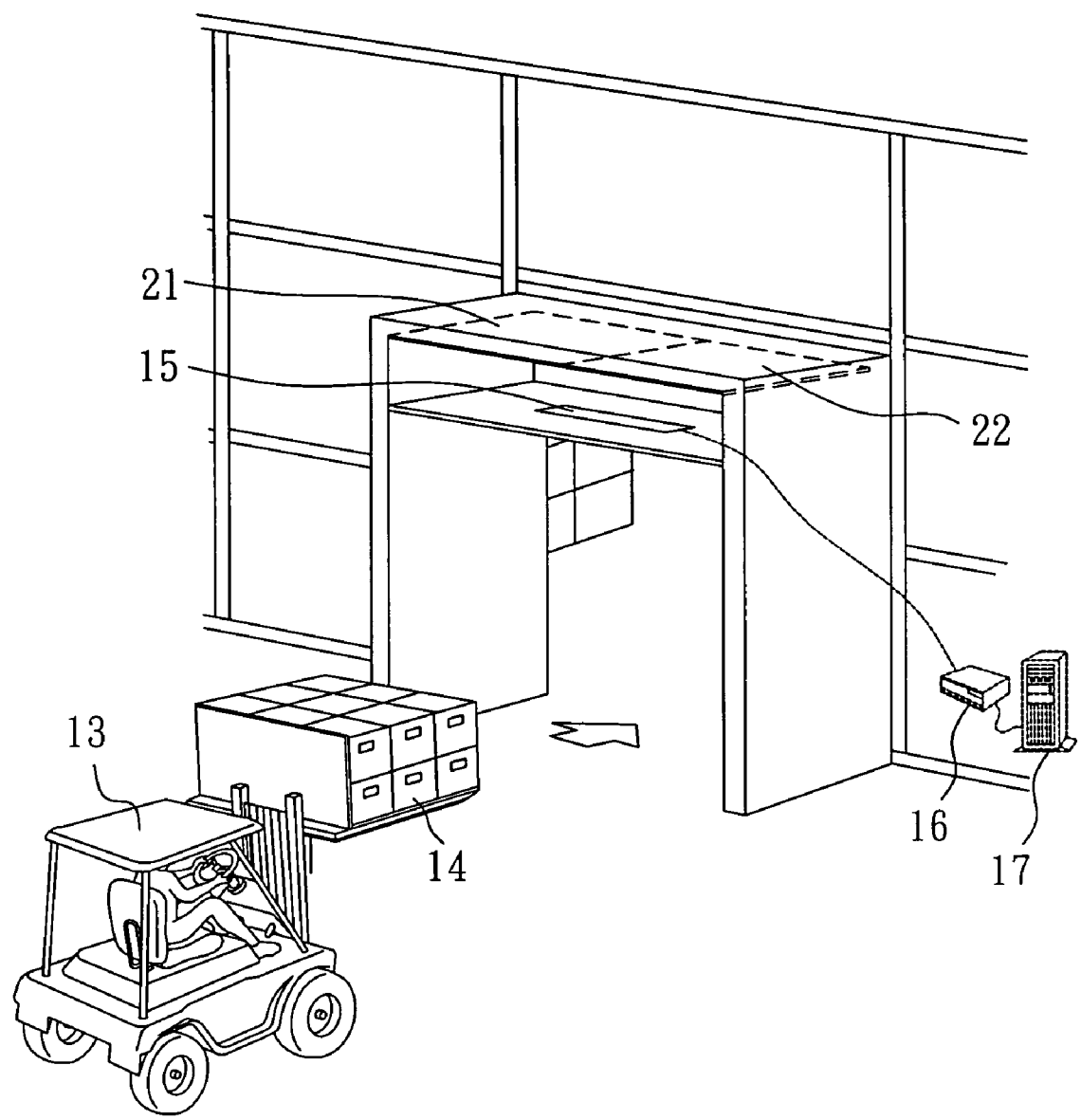
FIG. 2 is a schematic view of an enhanced mechanism for a RFID reader in accordance with the first preferred embodiment of the present invention.

The present invention discloses an enhanced mechanism for radio frequency identification reader. Referring to FIG. 2, the first metal plate 21 and the second metal plate 22 form an angle of 180 degrees, placing on an entrance of a building 12. When a truck 13 passes through the entrance of the building 12, the RFID tag 14 on the truck 13 will send out the RFID signal. The combination of the antenna 15 and metal plate 21 and 22 provides an antenna transmitting system with a high gain. When the transmitting system is linked with the RFID tag 14, the RFID signal will reach the reader 16, in which the information will be transformed and transferred to an edge server 17 to be decoded and processed. According to the Corner Reflector theory, the metal plate 21 and 22 can effectively strengthen the reception of antenna 15 of the RFID reader 16; as a result, it can effectively avoid the situation of low antenna gain for communication link.

Figure 3:
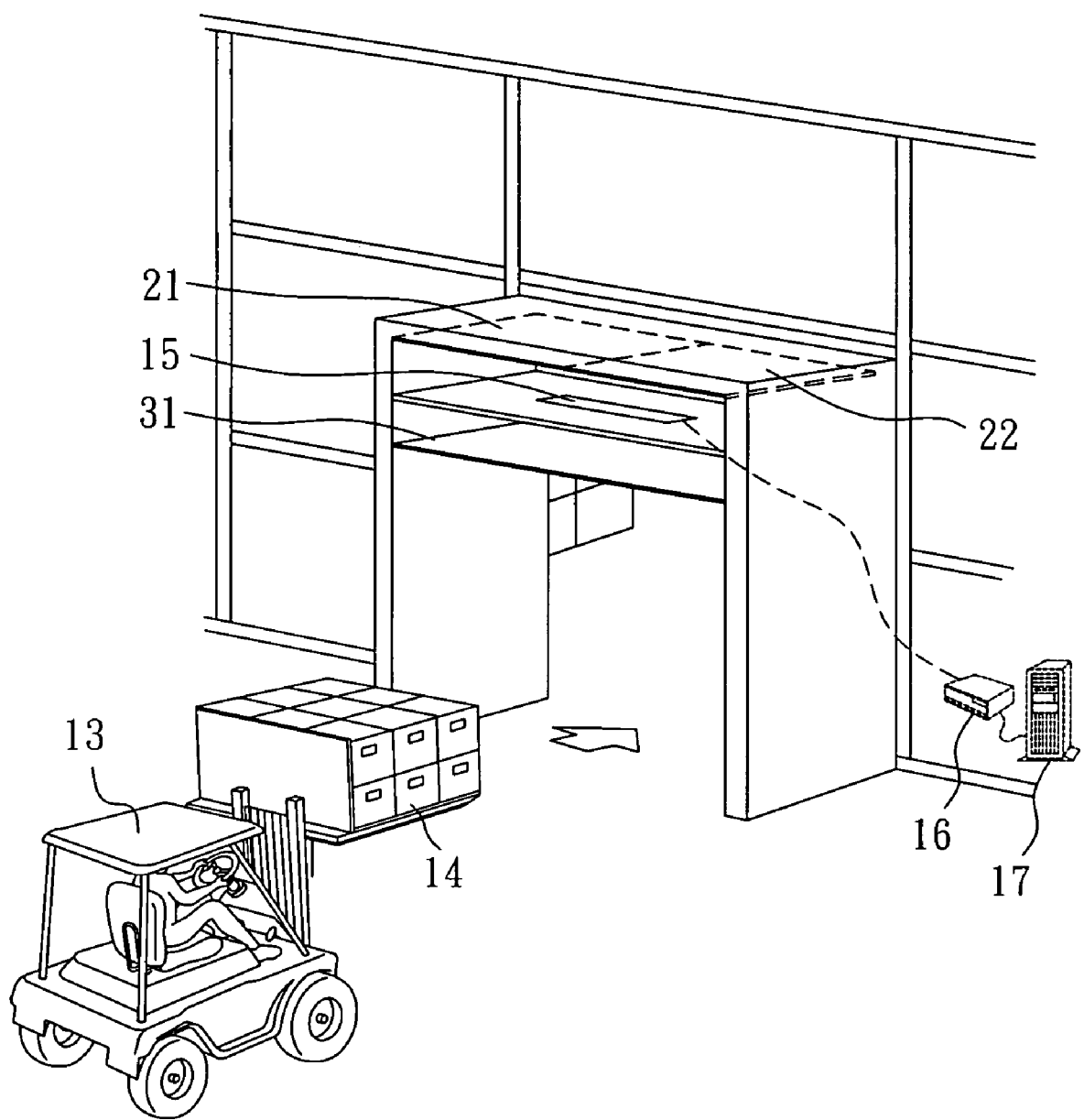
FIG. 3 is a schematic view of an enhanced mechanism for a RFID reader in accordance with the second preferred embodiment of the present invention.

Referring to FIG. 3, the angle between the first metal plate 21 and second metal plate 22 is 180 degrees, which is placed parallel to a partially reflective surface 31. Both the metal plates 21 and 22 and the partially reflective surface 31 are installed at the entrance of the building 12, with the antenna 15 in the middle. When a truck 13 passes through the entrance of the building 12, the RFID tag 13 on the truck 13 will send out the RFID signal. The combination of the partially reflective surface 31, the antenna 15, and metal plates 21 and 22 provides an antenna transmitting system with a better gain. When the transmitting system is linked with the RFID tag 14, the RFID signal will reach the reader 16. The reflective surface 31 and the metal plates 21 and 22 became a resonance cavity-like device; this mechanism can improve the radiated power gain. The antenna 15 will receive the gained signal and send the same to the reader 16, in which the information will be transformed and transferred to the edge server 17 to be decoded and processed.

Figure 4:
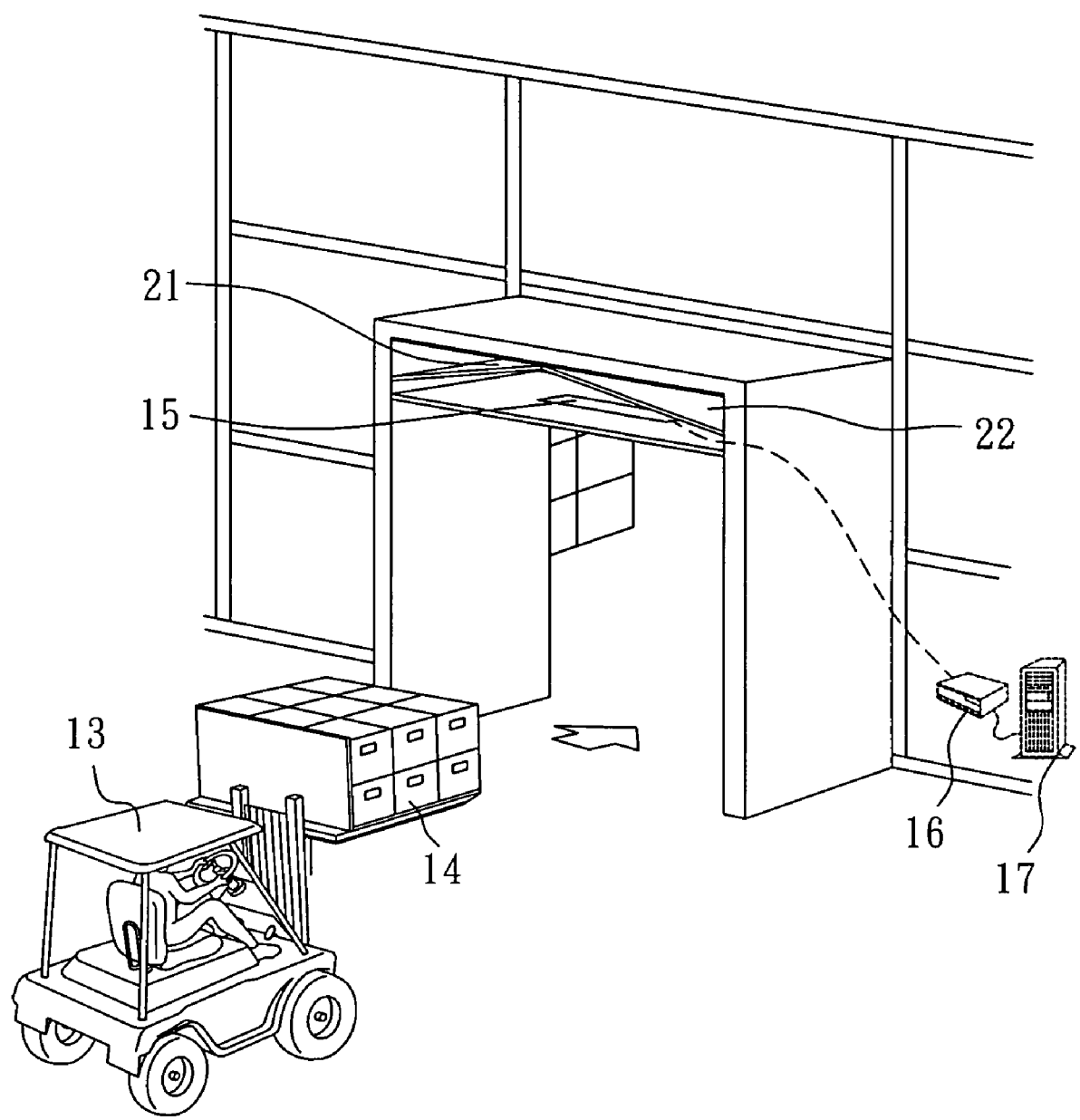
FIG. 4 is a schematic view of an enhanced mechanism for a RFID reader in accordance with the third preferred embodiment of the present invention.

Referring to FIG. 4, the angle of the first metal plate 21 and second metal plate 22 is between 30 to 180 degrees, placing at the entrance of the building 12. When the truck 13 passes through the entrance of the building 12, the RFID tag 14 on the truck 13 will send out the RFID signal. The combination of the antenna 15 and metal plates 21 and 22 provides an antenna transmitting system with a better gain. When the transmitting system is linked with the RFID tag 14, the RFID signal will reach the reader 16, in which the information will be transformed and transferred to an edge server 17 to be decoded and processed. According to the Corner Reflector theory, the metal plates 21 and 22 can effectively strengthen the reception of antenna 15 of the RFID reader 16; as a result, it can effectively avoid the situation of low antenna gain for communication link.

Figure 5:
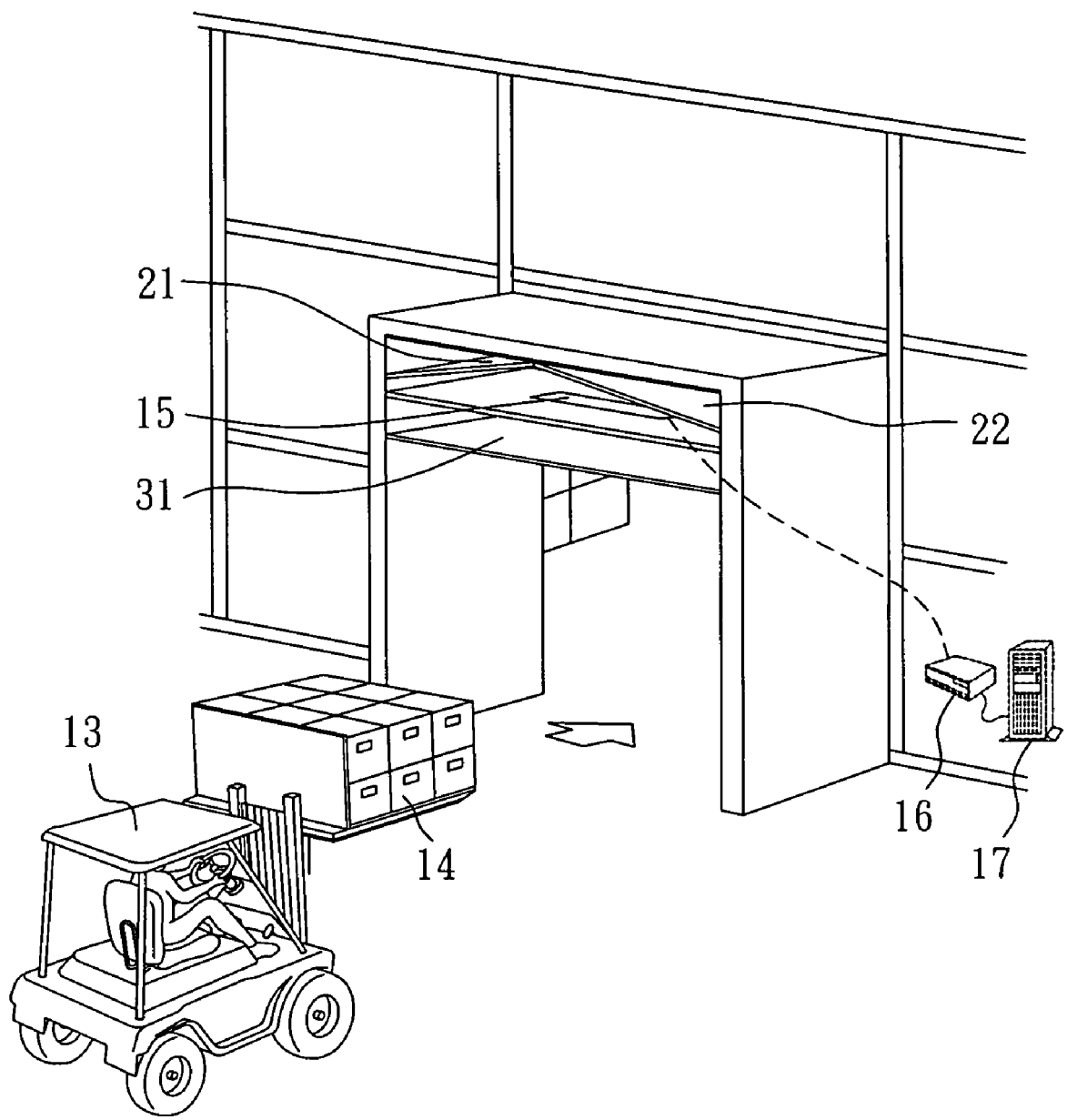
FIG. 5 is a schematic view of an enhanced mechanism for a RFID reader in accordance with the fourth preferred embodiment of the present invention.

Referring to FIG. 5, the angle of the first metal plate 21 and second metal plate 22 is between 30 to 180 degrees, and a partially reflective surface 31 is placed under the metal plates 21 and 22. Both of the reflective surface 31 and the metal plates 21 and 22 are placed at the entrance of the building 12, and the antenna is placed in-between the metal plates 21 and 22 and the partially reflective surface 31. When a truck 13 passes through the entrance of a building 12, the RFID tag 14 on the truck 13 will send out the RFID signal. The combination of the partially reflective surface 31, the antenna 15, and metal plates 21 and 22 provides an antenna transmitting system with a better gain. When the transmitting system is linked with the RFID tag 14, the RFID signal will reach the reader 16. The reflective surface 31 and the metal plates 21 and 22 became a resonance cavity-like device; this mechanism can improve the radiated power gain. The antenna 15 will receive the gained signal and send the same to the reader 16, in which the information will be transformed and transferred to an edge server 17 to be decoded and processed.

Furthermore, the antenna in the above embodiments can be a dipole antenna or a circular polarized antenna, and the standard RFID tag 14 can be its receiving media. As proven in the experiment, if the angle between the two metal plates is 180 degrees as shown in FIGS. 2 and 3, the use of circular polarized antenna has better effect in antenna gain. However, if the angle of the two metal plates is between 30 to 180 degrees as shown in FIGS. 4 and 5, the use of dipole antenna has better effect in antenna gain.

Although the present invention has been explained in relation to its preferred embodiment, it is to be understood that many other possible modifications and variations can be made without departing from the spirit and scope of the invention as hereinafter claimed.

What is claimed is:

1. An enhanced mechanism for RFID reader, comprising:
   an antenna for receiving RFID signal transmitted from an object under test and outputting the RFID signal to the RFID reader;
   a metal plate device having a first metal plate and a second metal plate that are disposed on a top inner surface of an entrance of a building, wherein the first metal plate and the second metal plate form an angle ranging from 30 to 180 degrees relative to each other, and wherein the metal plate device and the object under test are respectively placed on the opposite sides of the antenna, and the metal plate device and the antenna are combined to strengthen a reception of antenna to thereby provide a high gain to the antenna; and
   a partially reflective surface disposed in-between the antenna and the object under test and combining the first and the second metal plates to form a resonance cavity device to improve a radiated power gain.

2. The enhanced mechanism for RFID reader as claimed in claim 1, wherein the antenna is a circular polarized antenna.

3. The enhanced mechanism for RFID reader as claimed in claim 1, wherein the antenna is a dipole antenna.

4. The enhanced mechanism for RFID reader as claimed in claim 1, wherein an operating frequency of RFID signal is an ultra high frequency.

5. The enhanced mechanism for RFID reader as claimed in claim 1, wherein an operating frequency of RFID signal is a microwave frequency.

* * * * *